Figure 1:
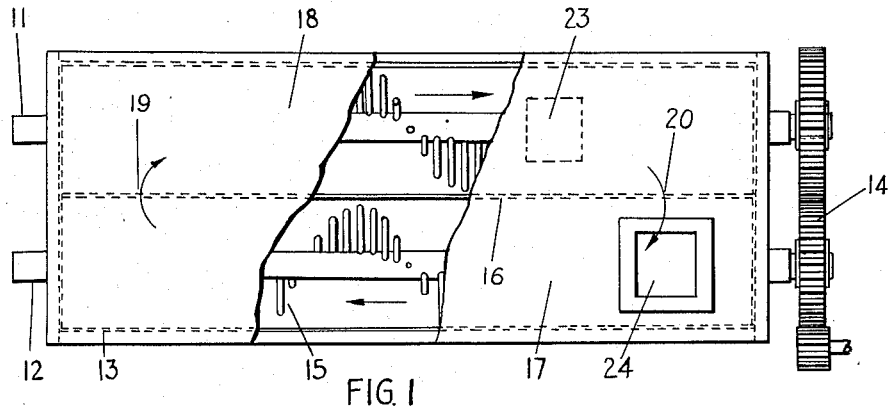

April 5, 1966     I. A. BROWNLIE ETAL     3,244,408

TROUGH MIXERS

Filed April 29, 1964     2 Sheets-Sheet 1

INVENTORS
ISAAC ALLAN BROWNLIE
GEORGE ANDREW WEMYSS
BY Cushman, Darby & Cushman
ATTORNEYS

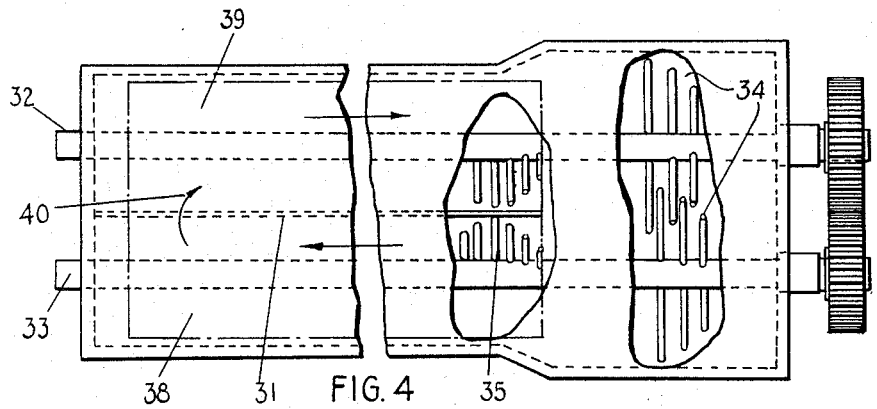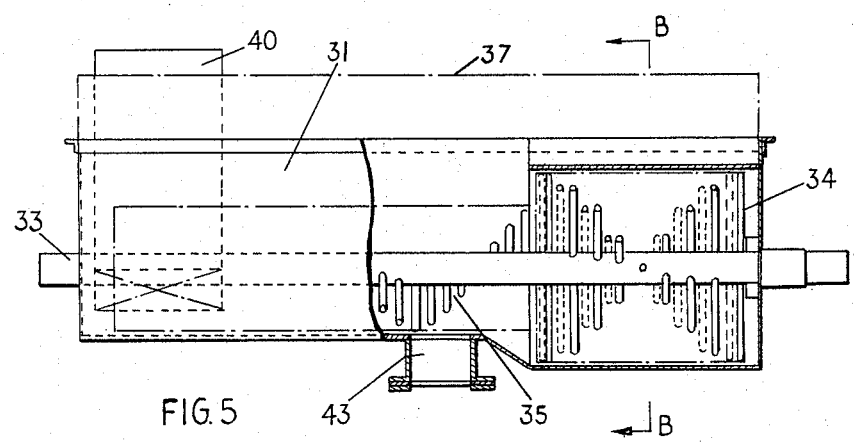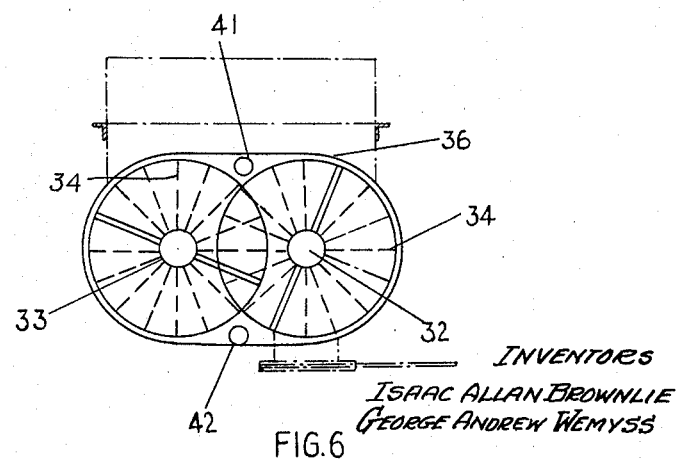

3,244,408
TROUGH MIXERS
Isaac Allan Brownlie and George Andrew Wemyss, Edinburgh, Scotland, assignors to Scottish Agricultural Industries Limited, Edinburgh, Scotland, a corporation of Great Britain
Filed Apr. 29, 1964, Ser. No. 363,459
Claims priority, application Great Britain, Apr. 30, 1963, 16,960/63
6 Claims. (Cl. 259—6)

The present invention relates to granulating apparatus of the trough mixer kind.

Granulating apparatus comprising a trough and a longitudinally fitted rotatable shaft having projecting members is well known.

The object of the present invention is to provide granulating apparatus of the trough mixer kind which has means for recycling longitudinally in a controlled manner within the trough non-gaseous material contained therein which is being subjected to a granulating operation.

According to the present invention a granulating apparatus comprising a trough fitted longitudinally with at least two rotatable shafts each provided with at least one series of helically arranged separate radially projecting members is one wherein the said trough is divided longitudinally at least for most of its length into two sections by a baffle, wherein each section contains at least one of said rotatable shafts, wherein the shafts are rotatable to propel non-gaseous material in a direction in one section opposite to the direction in the other section, wherein each of said rotatable shafts is adapted to be rotated at a speed at which the peripheral speed of its radially projecting members is at least 80 feet per minute, wherein there is provided at each end of the trough means permitting transfer of non-gaseous material from one section to the other, and wherein there are also provided means for the addition of material and means to permit the removal of non-gaseous material.

Preferably the granulating apparatus is fitted with two rotatable shafts, one in each section.

Preferably the projecting members are pins but alternatively they may be blades particularly on the shafts near the places of transfer. These blades may be so disposed as to assist the movement of non-gaseous material in the desired direction, i.e. where it is desired to transfer the non-gaseous material from one section to the other the surfaces of the terminal ends of the blades are disposed parallel to the shaft; where the desired direction of movement of non-gaseous material is along a section the entire blades are disposed at right angles to the shaft.

Preferably in a granulating apparatus according to the invention in which one shaft is fitted in each section, the drive to each shaft is so arranged that the shafts rotate in contrary directions and the direction of rotation of a right hand shaft, when viewed from an end of the granulator, is clockwise. This assists the transfer of material from one section to the other.

The rate of recycle of non-gaseous material within the granulator is controlled by the speed of rotation of the shafts and the arrangement of the projecting members fitted thereto. The type and arrangement of the projecting members on each shaft need not be the same along the length of the shaft so long as on rotation of the shaft the non-gaseous material is agitated sufficiently violently to cause formation of granules whilst it progresses along the section in the desired direction. Sufficient agitation for granulation is obtained if the peripheral speed of the projecting members is at least 80 feet per minute.

The means permitting transfer of material at each end of the trough from one section to the other is preferably an orifice in the baffle the size of which orifice is preferably alterable by an adjustable slide thereby controlling the bed depth in the granulator.

The means of introduction of materials into the trough may be, for example, a conveyor for solid materials or a pipe or pipes for liquids or gases. The means of extraction of materials is conveniently a port or hole situated preferably at a maximum distance along the path of travel of the non-gaseous material from the position of the means of introduction of materials.

The material of construction of the trough may be conveniently rubber or some such flexible material so that in operation the flexing movement of the sides of the trough will prevent solid material which is being mixed therein from building up thereon. Rigid materials are also suitable as materials of construction of the trough so long as they are not affected by the materials being mixed therein.

If it is desired the trough may be jacketed to allow a heating or cooling medium to be used to control the temperature of the materials being mixed.

The apparatus of the invention may be used as a granulator in which the raw materials are caused to adhere together to form granular particles. It is also possible to carry out a layering process of granulation in which the granules are built of successive layers of raw materials, part of which is usually added in a fluid form, on to recycled preformed granules. Furthermore the apparatus of the invention is applicable to those processes which involve exothermic reaction of aqueous reactants and in which it is desired to drive off the water phase after reaction.

Another process for which the apparatus of the invention is conveniently suited is that in which two stages are involved, each stage being carried out in a separate atmosphere. By arranging for the means of transfer to be choke fed, the atmospheres in the two sections may be effectively sealed from each other by the granules in the means of transfer.

Figure 2:
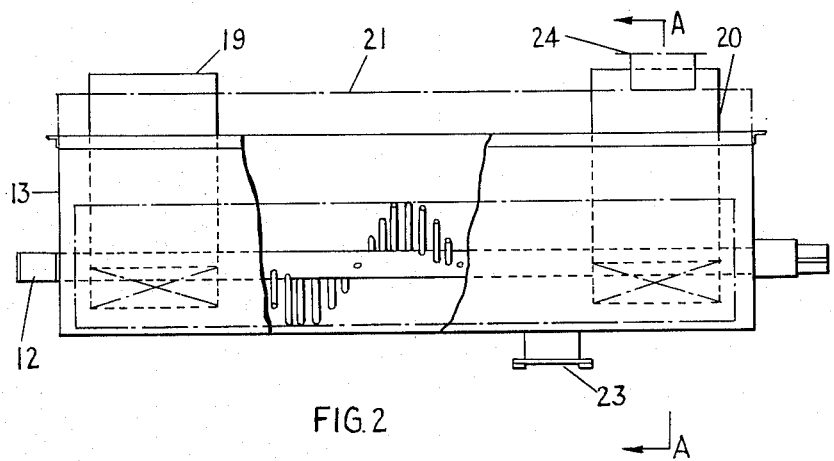
Figure 3:
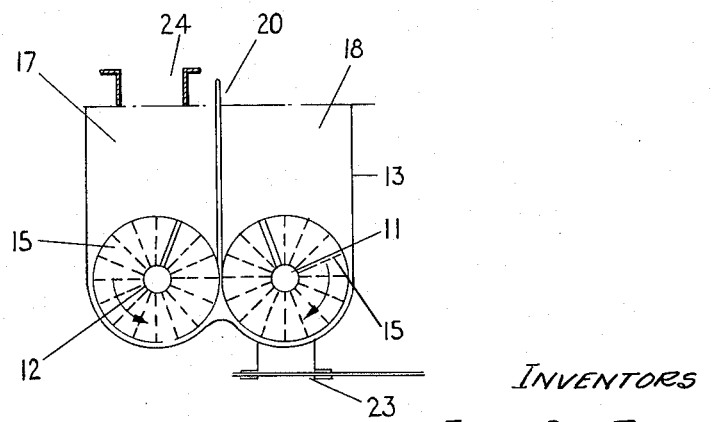

By way of example an embodiment of a trough granulator according to the invention will now be described with reference to the accompanying diagrammatic drawings. FIGURE 1 is a plan view of the trough granulator, FIGURE 2 is an elevation in part section and FIGURE 3 is a cross-section on the line A—A of FIGURE 2. The granulator comprises two rotatable shafts 11 and 12, mounted within trough 13, of ω-section, and driven in contra-directions by drive 14. Pins 15, are fitted to both shafts in such an arrangement that on rotation of shaft 11 the pins mounted thereon will propel non-gaseous material towards the drive 14, and such that on rotation of shaft 12 the pins mounted thereon will propel non-gaseous material away from the drive 14. The direction of travel of non-gaseous material is indicated by arrows in FIGURE 1. A baffle 16 is fitted between the shafts 11 and 12 which thus divides the trough 13 into two sections 17 and 18, and prevents non-gaseous material passing from one section to the other except through holes, at either end of the baffle 16, the size of which can be altered by the slides 19 and 20. The sides of the trough 13, and the baffle 16, are sufficiently high to prevent non-gaseous material from being flung out of the granulator. Sometimes it is desired to dry the non-gaseous material being processed, in which case the trough is covered with a lid 21, and there is provided a gas off-take duct not shown in the diagrams, through which gases and vapours evolved in the process can be extracted. Port 23, is the means of extraction of processed material and port 24, is the means of addition of material to be processed. In operation, on rotation of the shafts 11 and 12, non-gaseous material is conveyed away from the point of addition 24, towards the far end of the granulator where it spills through transfer means 19, into the other section 18. It is then propelled along this section 18, towards the extraction port 23, where some of it is extracted and the rest passes through the holes in the baffle 16, into section 17, and there more material to be processed is added to it through port 24.

The embodiment may be conveniently used to granulate solids together by a batch agglomeration process in the following manner. Powered single superphosphate (44 parts), ground ammonium sulphate (41½ parts), and crystalline potassium chloride (14½ parts) are put into the granulator. Rotation of the shafts 11 and 12 to cause the peripheral speed of the pins to be about 80 feet per minute intimately mixes the materials in a short space of time. If the moisture content of the mixture is raised to 9.2% the rotation of the shafts 11 and 12 causes the mixture to agglomerate rapidly and after three minutes granules are formed in the following size range distribution.

|  | Mixture before granulation, percent | Granular product, percent |
|---|---|---|
| +8 B.S. mesh | 5.1 | 29.8 |
| 8–16 B.S. mesh | 13.0 | 19.4 |
| 16–30 B.S. mesh | 27.6 | 28.6 |
| −30 B.S. mesh | 54.3 | 22.2 |
|  | 100.0 | 100.0 |

FIGURES 4, 5 and 6 illustrate, by way of example, a second embodiment of the invention. FIGURE 4 is a plan view of a trough granulator. FIGURE 5 is an elevation in part section, and FIGURE 6 is a cross section on the line B—B of FIGURE 5. The direction of travel of non-gaseous material is indicated by arrows in FIGURE 4. This embodiment differs from the first in that the baffle 31, does not extend to the drive end of the trough granulator. The shafts 32 and 33, are fitted with pins 34 in the portion of the granulator where the baffle 31 does not extend. These pins 34 are longer than the pins 35 in the rest of the granulator. The pins 34, on the shafts 32 and 33, intermesh. The section of the granulator where the long pins 34 are situated is totally enclosed by a casing 36. The granulator has high walls and is fitted with a lid 37, and a gas offtake duct not shown in the diagrams. The granulator is divided by the baffle 31, into two sections 38 and 39. A means of transferring non-gaseous material from one section to the other is provided by a hole in the baffle 31, the size of the hole being regulated by slide 40. Pipes 41 and 42 are provided for the introduction of reactants and port 43 for the removal of non-gaseous material. This port 43 is situated in said section 39 and in the proximity of that end of the baffle 31 nearer the drive means.

This second embodiment may be conveniently used to manufacture granular ammonium phosphate direct from phosphoric acid and gaseous ammonia in the following manner. A starting bed of solid ammonium phosphate is put into the trough granulator. The movement of the pins 34 and 35 of length 7″ on the shafts 32 and 33 when the latter is rotated in an anti-clockwise direction, at 107 revolutions per minute, as viewed in FIGURE 6, will cause this material to be violently disturbed and to be propelled at the same time along section 38, through the hole in the baffle 31, into section 39, along this section 39, into the zone where the long pins 34 are situated from where it will be transferred by the movement of these pins 34, into section 38. The pipes 41 and 42 extend from the drive end of the shafts up to the end of baffle 31 nearer the drive means and are used for the introduction of phosphoric acid and ammonia, respectively, onto the bed of solid ammonium phosphate where it is agitated by pins 34, which, because they intermesh, remain clear of build-up in spite of the sticky condition of the bed. The acid and ammonia react to give more ammonium phosphate. As this freshly-formed ammonium phosphate passes into section 38, the heat of reaction causes water, originally present in the phosphoric acid, to be evaporated and removed through the gas offtake duct. Hence substantially dry ammonium phosphate is formed. An amount of ammonium phosphate equivalent to that formed by the interaction of the phosphoric acid and ammonia added to the bed is removed as product, through the port 43. This embodiment is suitable for the manufacture of granular ammonium salts from ammonia and the corresponding acid so long as the heat of reaction is sufficient to evaporate water introduced into the granulator by the reactants.

What we claim is:

1. A granulating apparatus for treating a fertilizer material comprising: a trough divided longitudinally at least for most of its length into two sections by a baffle; a rotatable shaft disposed longitudinally in each section, each of said shafts having at least one series of helically arranged separate radially projecting members, said shafts being rotatable to propel non-gaseous material in a direction in one section opposite to the direction in the other section; means at each end of said trough for transferring fertilizer material from one section to the other whereby the fertilizer may be recycled within said trough; means for rotating said shafts at a speed which imparts a peripheral speed of at least 80 feet per minute to the tips of said projecting members; means for introducing fertilizer material into one section of said trough; means for withdrawing fertilizer granules from the other section of said trough, said withdrawing means defining a port situated approximately at a maximum distance from said introducing means in the direction of recycle of the material in said trough.

2. A granulating apparatus as claimed in claim 1 wherein the projecting members are pins.

3. A granulating apparatus as claimed in claim 1 wherein the means permitting transfer of material at each end of the trough from one section to the other is a discontinuous portion of said baffle defining an orifice, said projecting members on said shafts being out of contact with each other at the location of the orifice.

4. A granulating apparatus as claimed in claim 3 wherein the size of the orifice is alterable by an adjustable slide.

5. A granulating apparatus as claimed in claim 1 wherein the material of construction of the trough is rubber.

6. A granulating apparatus as claimed in claim 1 wherein the trough is jacketed.

References Cited by the Examiner

UNITED STATES PATENTS

| 1,013,612 | 1/1912 | Peters | 259—6 |
| 1,433,865 | 10/1922 | Wolf | 259—97 |
| 2,761,657 | 9/1956 | Rietz | 259—97 |
| 3,011,876 | 12/1961 | Raistrick | 259—9 |
| 3,134,579 | 5/1964 | Booth | 259—64 |

WALTER A. SCHEEL, *Primary Examiner.*

CHARLES A. WILLMUTH, *Examiner.*

ROBERT W. JENKINS, *Assistant Examiner.*